US008063734B2

(12) United States Patent
Conforti

(10) Patent No.: US 8,063,734 B2
(45) Date of Patent: Nov. 22, 2011

(54) ACCESS CONTROL SYSTEM WHEREIN THE REMOTE DEVICE IS AUTOMATICALLY UPDATED WITH A CENTRAL USER LIST FROM THE CENTRAL STATION UPON USE OF THE REMOTE DEVICE

(75) Inventor: Fred J. Conforti, Lisle, IL (US)

(73) Assignee: Harrow Products LLC, Montvale, NJ (US)

( * ) Notice: Subject to any disclaimer, the term of this patent is extended or adjusted under 35 U.S.C. 154(b) by 1166 days.

(21) Appl. No.: 11/556,866

(22) Filed: Nov. 6, 2006

(65) Prior Publication Data

US 2008/0106369 A1 May 8, 2008

(51) Int. Cl.
*G05B 19/00* (2006.01)

(52) U.S. Cl. ........ 340/5.61; 340/5.1; 340/5.2; 340/5.51; 340/5.52; 340/5.7; 340/5.81; 340/5.82; 340/5.83; 340/5.84; 340/5.85

(58) Field of Classification Search .................... 340/5.5
See application file for complete search history.

(56) References Cited

U.S. PATENT DOCUMENTS 4,079,605 A 3/1978 Bartels
5,491,471 A 2/1996 Stobbe
5,890,075 A * 3/1999 Cyr et al. ...................... 455/560
5,936,544 A 8/1999 Gonzales et al.
5,959,541 A * 9/1999 DiMaria et al. .............. 340/5.52
6,072,402 A 6/2000 Kniffin et al.
6,161,005 A 12/2000 Pinzon
6,218,955 B1 4/2001 Conklin
6,359,547 B1 3/2002 Denison et al.
6,525,645 B2 2/2003 King et al.
6,535,136 B1 3/2003 Rodenbeck et al.
6,657,538 B1 * 12/2003 Ritter ........................... 340/5.81
(Continued)

FOREIGN PATENT DOCUMENTS

KR 012001044328 6/2001
(Continued)

OTHER PUBLICATIONS

University of Wisconsin-Madison, University Police Department website, Access Control and Access Cards, http://www.uwpd.wisc.edu/Access%20Cards%20and%20Control.html, available at least as earlier as May 15, 2006.

*Primary Examiner* — Benjamin C Lee
*Assistant Examiner* — Curtis King
(74) *Attorney, Agent, or Firm* — Michael Best & Friedrich LLP

(57) ABSTRACT

A method of operating an access control system including a remote control system configured to control a lock an a central control system configured to wirelessly communicate with the remote control system. The method includes inputting user data into a user identification reader of the remote control system, and in response to inputting user data, requesting updating a remote user list stored by the remote control system with a central user list stored by the central control system using a wireless communicator of the remote control system and a wireless communicator of the central control system. The method further includes comparing the user data with one of the remote user list and the central user list to determine whether to unlock the lock.

16 Claims, 6 Drawing Sheets

U.S. PATENT DOCUMENTS

| | | | | |
|---|---|---|---|---|
| 6,714,118 | B1 | 3/2004 | Frolov et al. | |
| 6,720,861 | B1 | 4/2004 | Rodenbeck et al. | |
| 6,963,280 | B2 | 11/2005 | Eskildsen | |
| 6,967,562 | B2 | 11/2005 | Menard et al. | |
| 6,976,269 | B1 * | 12/2005 | Avery et al. | 726/2 |
| 7,009,489 | B2 | 3/2006 | Fisher | |
| 2002/0014950 | A1 | 2/2002 | Ayala et al. | |
| 2002/0099945 | A1 | 7/2002 | McLintock et al. | |
| 2003/0117263 | A1 | 6/2003 | Gonzales et al. | |
| 2003/0151493 | A1 | 8/2003 | Straumann et al. | |
| 2004/0075530 | A1 | 4/2004 | Ghabra et al. | |
| 2004/0160305 | A1 | 8/2004 | Remenih et al. | |
| 2004/0174247 | A1 | 9/2004 | Rodenbeck et al. | |
| 2005/0030153 | A1 | 2/2005 | Mullet et al. | |
| 2005/0044906 | A1 | 3/2005 | Spielman | |
| 2005/0099262 | A1 | 5/2005 | Childress et al. | |
| 2005/0168320 | A1 | 8/2005 | Henderson et al. | |
| 2005/0264396 | A1 * | 12/2005 | Horkavi et al. | 340/5.28 |
| 2006/0012461 | A1 | 1/2006 | Tsui | |
| 2006/0038654 | A1 | 2/2006 | Khalil | |
| 2006/0214767 | A1 * | 9/2006 | Carrieri | 340/5.61 |

FOREIGN PATENT DOCUMENTS

| | | | |
|---|---|---|---|
| WO | 9722772 | A1 | 6/1997 |

* cited by examiner

ACCESS CONTROL SYSTEM WHEREIN THE REMOTE DEVICE IS AUTOMATICALLY UPDATED WITH A CENTRAL USER LIST FROM THE CENTRAL STATION UPON USE OF THE REMOTE DEVICE

BACKGROUND

The present invention relates to access control systems that control locks, and more particularly to access control systems that communicate using wireless communication.

Typically, access control systems include a remote control system located adjacent a door and a central control system located some distance away from the door and the remote control system. Often, the access control system will include multiple remote control systems that control access to multiple doors such that one remote control system is located at each door controlled by the access control system. In such a construction, each of the remote control systems communicates with the central control system. In one application, the remote control systems communicate with the central control system via wireless communication. When wireless communication is utilized, often each of the remote control systems will be powered by a local battery.

SUMMARY

In one embodiment, the invention provides a method of operating an access control system including a remote control system configured to control a lock and a central control system configured to wirelessly communicate with the remote control system. The method includes inputting user data into a user identification reader of the remote control system, and in response to inputting user data, requesting updating a remote user list stored by the remote control system with a central user list stored by the central control system using a wireless communicator of the remote control system and a wireless communicator of the central control system. The method further includes comparing the user data with one of the remote user list and the central user list to determine whether to unlock the lock.

In another embodiment the invention provides an access control system that includes a central control system and a remote control system. The central control system is configured to store a central user list and is operable to update the central user list. The central control system includes a wireless communicator operable to transmit the central user list. The remote control system is configured to store a remote user list. The remote control system includes a wireless communicator operable to receive the central user list from the central control system, and a user identification reader operable to receive user data from a user of the remote control system. The remote control system initiates a wireless communication with the central control system in response to receipt of the user data to update the remote user list with the central user list.

Other aspects of the invention will become apparent by consideration of the detailed description and accompanying drawings.

Before any embodiments of the invention are explained detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
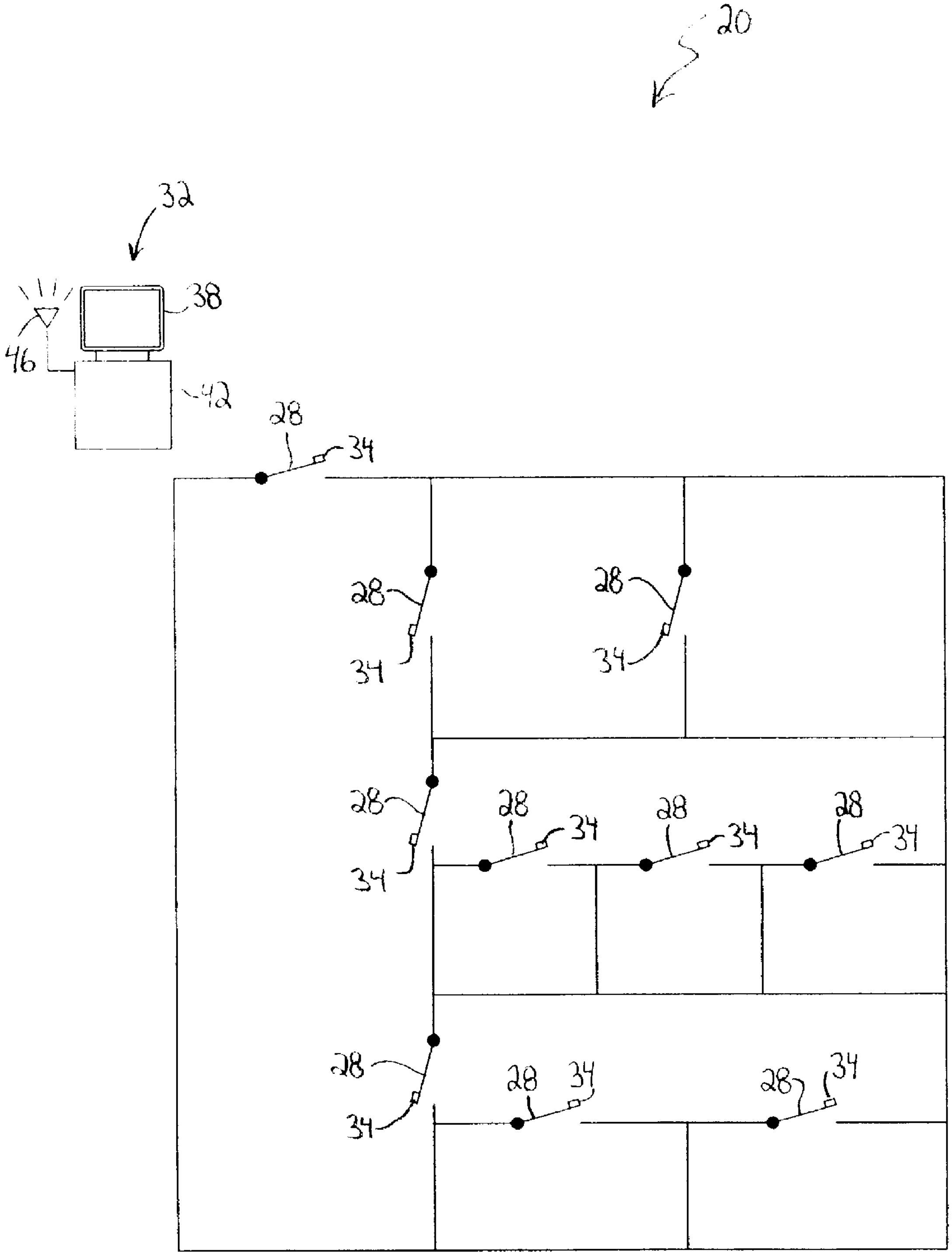
FIG. 1 is a schematic illustration of an access control system embodying the present invention.

FIG. 1 illustrates an access control system 20 that controls access through doors 28. The access control system 20 includes a central control system 32 and a plurality of remote control systems 34 that wirelessly communicate with the central control system 32. In the illustrated construction, each door 28 includes a respective remote control system 34. It should be understood that the arrangement of doors 28, the remote control systems 34, and the central control system 32 illustrated in FIG. 1 is just one possible arrangement, and in other constructions, the access control system can include any suitable number of remote control systems and central control systems to control access through any suitable number of doors.

Figure 2:
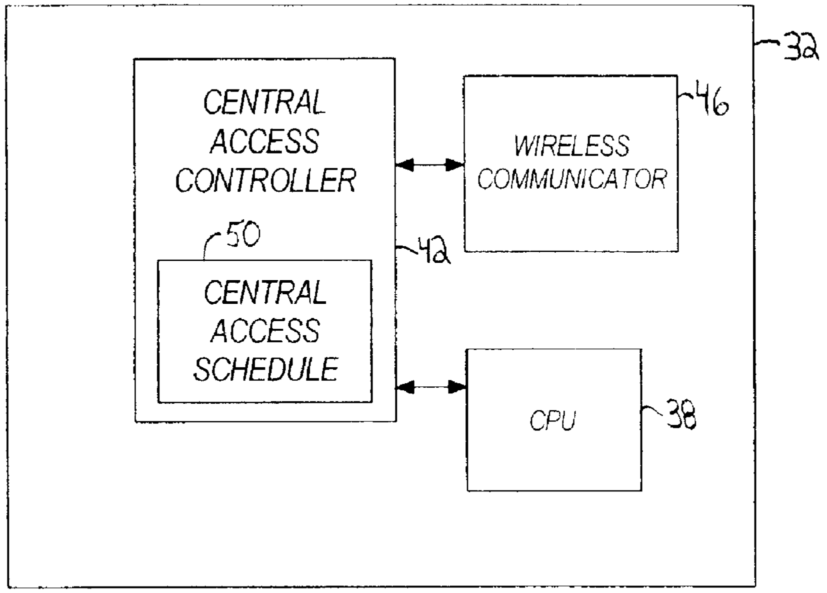
FIG. 2 is a schematic illustration of a central control system of the access control system of FIG. 1.

Referring to FIGS. 1 and 2, the illustrated central control system 32 includes a central control computer 38 having a central access controller 42 and a wireless communicator 46. The central control computer 38 can be located at any suitable distance from the remote control systems 34 and the doors 28.

The central access controller 42 is configured to electronically store a central user list 50. The central user list 50 is a database of users that are permitted access through one or more of the doors 28. The users can be associated within the database using any suitable data, such as a code that is unique to each user.

An administrator of the access control system 20 can update the central user list 50 (i.e., add or remove users from the user list or grant/deny access through specific doors 28). In one construction, the administrator utilizes the central control computer 38 to update the central users list 50.

The wireless communicator 46 is electrically coupled to the central access controller 42. The wireless communicator 46 provides wireless communication between the central control system 32 and the remote control systems 34. The illustrated wireless communicator 46 is a bidirectional wireless communicator such that the wireless communicator 46 can either transmit or receive information. The wireless communicator 46 can utilize any suitable wireless communication technology, such as radio frequency, infrared, ultrasonic, magnetic, and the like.

In the illustrated construction, each of the remote control systems 34 is substantially the same and therefore only one of the remote control systems 34 and its operation will be discussed in detail below.

Figure 3:
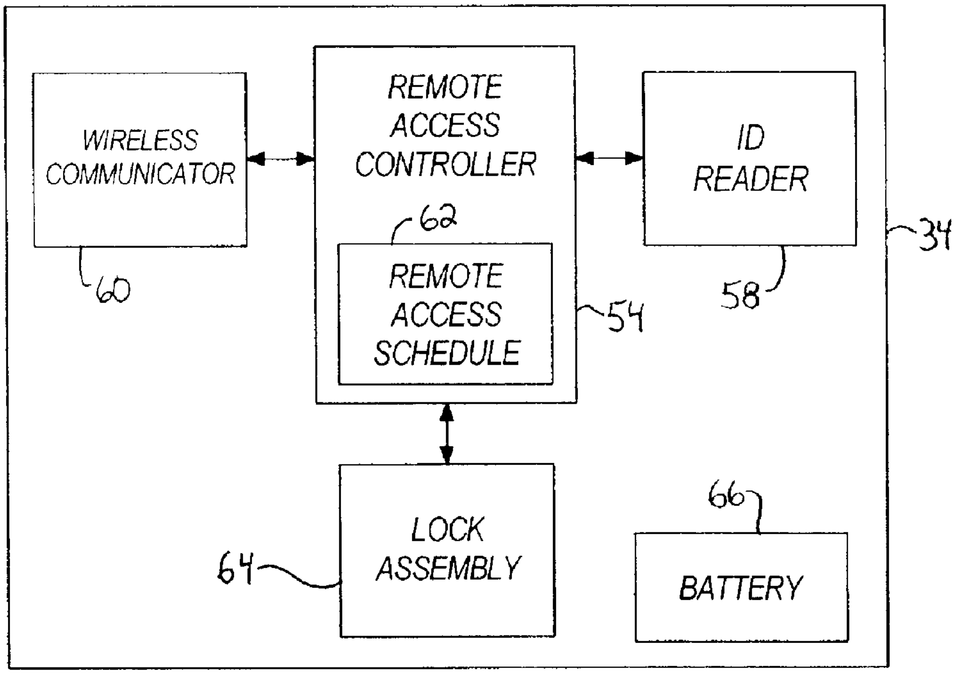
FIG. 3 is a schematic illustration of a remote control system of the access control system of FIG. 1.

Referring to FIGS. 1 and 3, the illustrated remote control system 34 includes a remote access control 54, a user identification reader 58, a wireless communicator 60, and a lock assembly 64. The remote access controller 54 electronically stores a remote user list 62. The remote user list 62 is locally stored by the remote access controller 54, which in the illustrated construction is located adjacent or near the door 28. Thus, the remote control system 34 can access or utilize the remote use list 62 without communicating with the central control system 32. Similar to the central user list 50, the remote user list 62 is a database of users that are permitted access through the respective door 28. The users can be associated within the database using any suitable data, such as a code that is unique to each user. As will be discussed in more detail below, after the administrator of the access control system 20 updates the central user list 50, the remote user list 62 is updated with the updated central user list 50.

The wireless communicator 60 of the remote control system 34 communicates with the wireless communicator 46 of the central control system 32 to provide communication between the remote and central control systems 34 and 32. The illustrated wireless communicator 60 of the remote control system 34 is a bidirectional wireless communicator such that the wireless communicator 60 can transmit or receive information. The wireless communicator 60 can utilize any suitable wireless communication technology, such as radio frequently, infrared, ultrasonic, magnetic, and the like.

The user identification reader 58 can be any suitable device that is operable to read data or a credential supplied by the user ("user data"). In one construction, the user identification reader 58 reads biometric user data, such as the user's fingerprint, retina, eye, handprint, facial blood flow, voice, and the like. In other constructions, the user identification reader 58 can include a keypad and the user can input user data by entering a code using a keypad. In yet other construction, the user identification reader 58 can read magnetic information form a card, security badge, and the like. The user identification reader 58 is electrically coupled to the remote access controller 54 such that the user identification reader 58 transmits the user data to the remote access controller 54.

The lock assembly 64 of the remote control system 34 can be any suitable lock assembly that is operable to lock and unlock the respective door 28. The lock assembly 64 is electrically coupled to the remote access controller 54. The remote access controller 54 controls the lock assembly 64 and determines whether to lock and unlock the lock assembly 64. As would be understood by one of skill in the art, when the remote access controller 54 unlocks the lock assembly 64, a bolt or other similar member of the lock assembly 64 is retracted such that the user is able to open the respective door 28.

The illustrated remote control system 34 further includes a battery 66. The battery 66 provides power to the remote control system 34. In the illustrated construction, the remote control system 34 can function without an additional power supply from electrical wires. Therefore, the remote control system 34 can be at a location where a power supply from electrical wires is not readily available. In other constructions, the remote control system could receive power from electric wires or a combination of electric wires and the battery 66 such that the battery provides a back-up power supply.

Referring to FIGS. 1-3, in operation, the administrator of the access control system 20 inputs the central user list 50 into the central access controller 42 using the central computer 38. The central user list 50 is downloaded to the remote access controller 54 of the remote control system 34. Eventually, the administrator will update the central user list 50 to ad or remove users from the central user 50 list thereby providing an updated central user list 50. Alternatively, or in addition, the administrator may also update the central user list 50 by granting or denying access to existing users through specific doors 28.

In one embodiment, the remote control system 34 is not in continues communication with the central control system 32. For example, in such an embodiment, the wireless communicator 60 of the remote control system 34 is in a standby mode or turned "off" such that the wireless communicator 60 is not communicating with the central control system 32. Therefore, the wireless communicator 50 of the remote control system 34 is using minimal or no power from the battery 66. By using the standby mode, the lifespan of the battery 66 is extended compared to a system where wireless communication between the central and remote control systems is continuous or more frequent.

Figure 4:
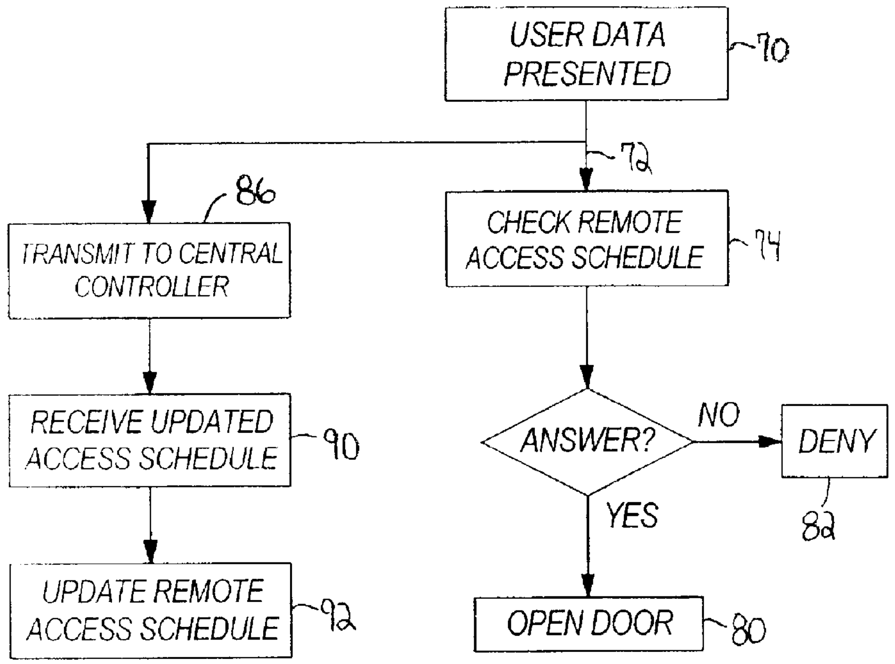
FIGS. 4-8 are flow diagrams illustrating methods of operating the access control system of FIG. 1.

FIG. 4 illustrates one method of operating the access control system 20 and updating the remote user list 62 with the central user list 50. Referring to FIGS. 1-4, in the method of operation illustrated in FIG. 4, when the user desires access through one of the doors 28, the user inputs the user data into the user identification reader 58 that is adjacent the door 28 (step 70). The remote control system 34 is in the standby mode such that the remote control system 34 utilizes little or no power from the battery 66. When the user inputs the user data (step 70), the remote control system 34 activates or 'wakes-up' and the battery 66 supplies power or additional power to the remote control system 34, including the wireless communicator 60, the remote access controller 54, the identification reader 58, and the lock assembly 64.

In the method of operation illustrated in FIG. 4, after the user data is received by the user identification reader 58, the user data is transmitted (represented by line 72) to the remote access controller 54 (FIG. 3). The remote access controller 54 compares the user data with the remote user list 62 (step 74). If the user data matches data on the remote user list 62, the remote access controller 54 signals the lock assembly 64 to unlock (step 80). When the lock assembly 64 unlocks, the user is able to open the respective door 28. If the user data does not match data on the remote user list 62, the lock assembly 64 remains in the locked configuration and the user is denied access through the door 28 (step 82). Meanwhile, generally as the user data is compared with the remote user list 62 (step 74), the remote access controller 54 initiates wireless communication, via the remote wireless communicator 60, with the central control system 32 to request an updated user list from the central access controller 42 (step 86).

Next, the central access controller 42 communicates with the remote access controller 54 (via the wireless communicators 46 and 60) to update the remote user list 62 with the central user list 50 (steps 90 and 92). Updating the remote user list 62 may include verifying that no changes have been made to the central user list 50 since the last request for an updated user list by the remote control system 32. However, if changes have been made to the central user list 50 since the last request for an updated user list, the remote access controller 54 receives the updated list (step 90) and the remote access controller 54 downloads and updates the remote user list 62 (step 92) to provide the remote user list 62 with the updated central user list 50.

After the user has been either granted or denied access trough the door 28 (i.e., whether the lock assembly 64 has been unlocked) and the remote user list 62 has been updated, the remote access control system 34 returns to the standby mode of operation. In the standby mode, the power supplied to the remote access control system 34 is reduced, restricted, or turned off. Therefore, in the illustrated method of operation, the wireless communicator 60 is no longer in communication with the central control system 34 until the remote control system 34 is re-activated by a user inputting user data. As a result, the battery power is conserved an the life of the battery 66 is extended.

Figure 5:
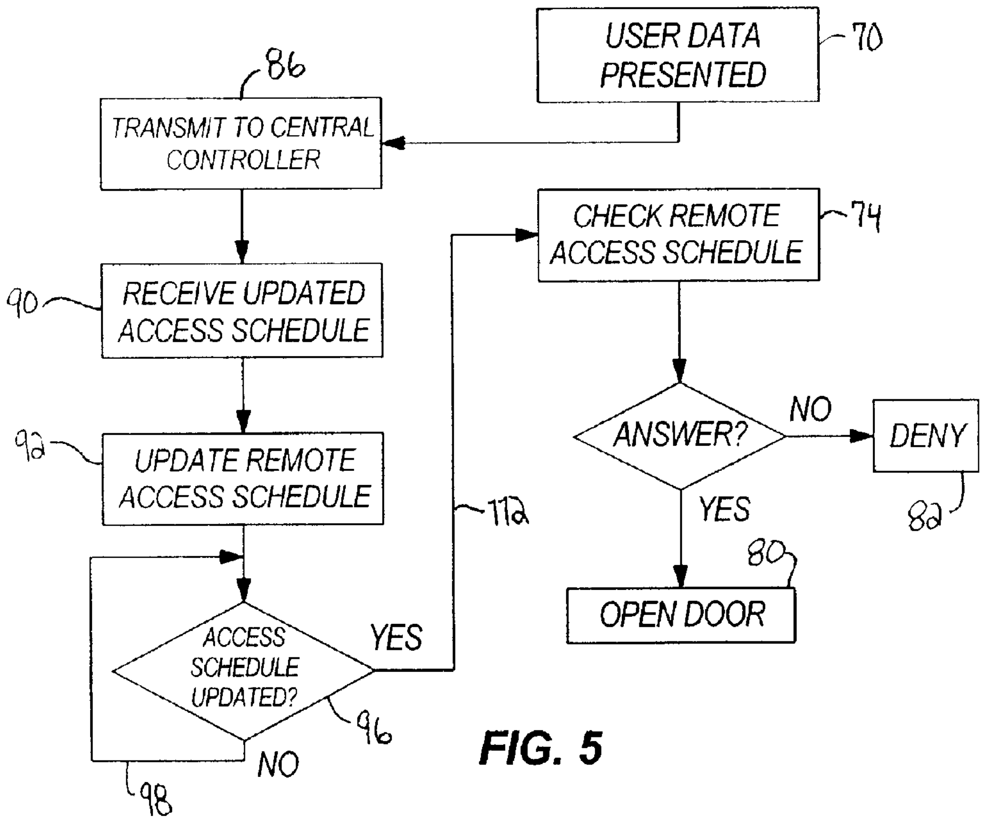

FIG. 5 illustrates an alternative method of operating the access control system 20. The method of operating the access control system 20 illustrated in FIG. 5 is somewhat similar to the method of operating the access control system 20 of FIG. 4. Therefore, only the general differences will be discussed in detail below and like steps have been given like reference numbers.

In the method illustrated in FIG. 5, after the user inputs the user data (step 70), the wireless communicator 60 of the remote control system 34 initiates communication with the central control system 32 to request updating the remote user list (step 86). As discussed above with regard to the method of operation illustrated in FIG. 4, the remote user list 62 is updated (steps 90 and 92). In addition, the remote access controller 54 determines whether the update of the remote user list 62 is complete (step 96). If the update has not been completed (indicated by line 98), on a periodic interval the remote access controller 54 continues to determine whether the update is complete (step 96). After the update of the remote user list 62 is completed (indicated by line 112) the user data is compared with the updated remote user list (step 74). As discussed above with regard to the method of FIG. 4, the user data is compared with the remote user list 62 to determine whether to grant or deny access through the door 28 or unlock the lock assembly 64 (steps 80 and 82).

Figure 6:
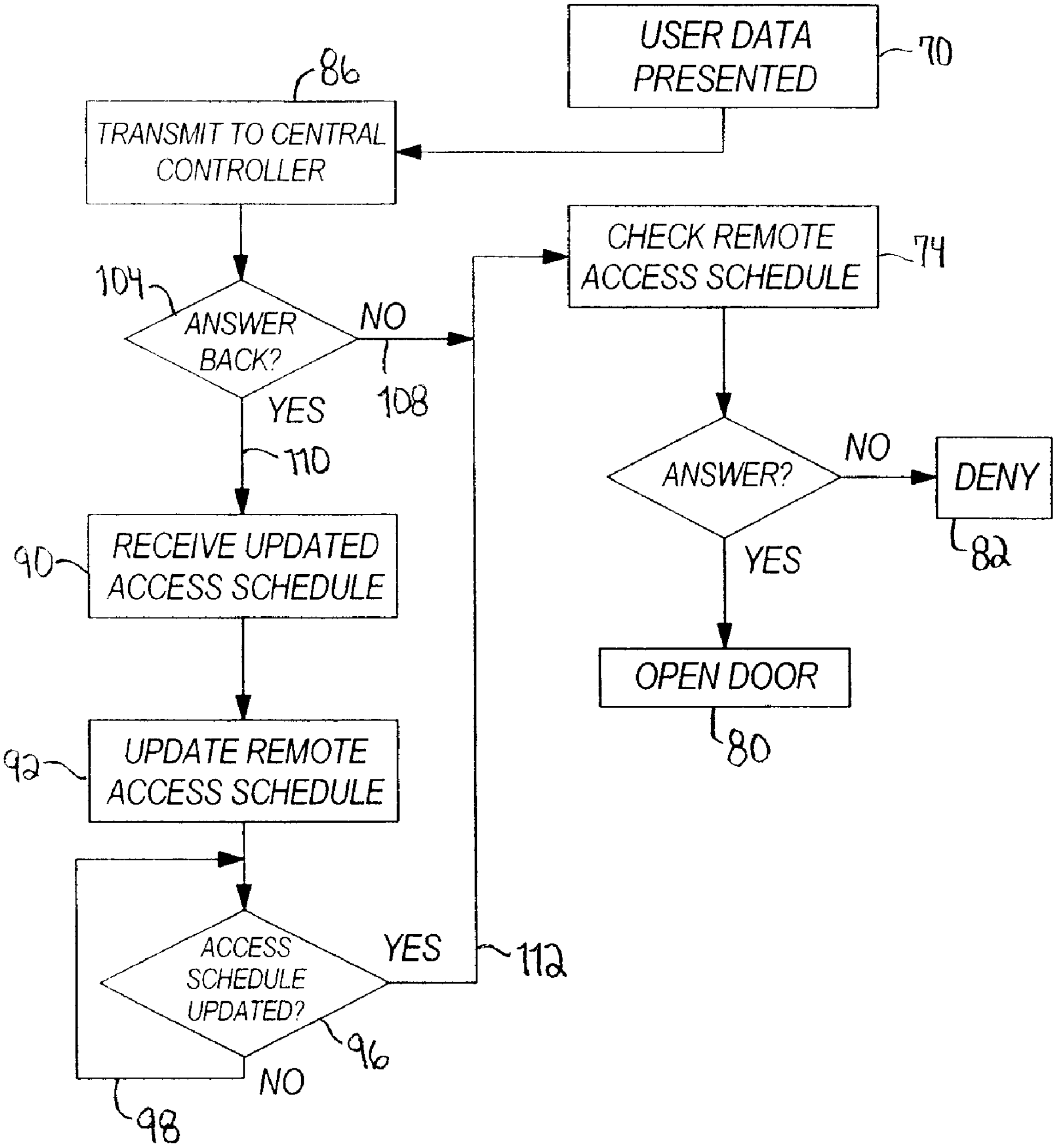

FIG. 6 illustrates yet another method of operating the access control system 20. The method of operating the access control system 20 illustrated in FIG. 6 is somewhat similar to the method of operating the access control system 20 illustrated in FIGS. 4-5. Therefore, only the general differences will be discussed in detail below and like steps have been given like reference numbers.

The method of operating the access control system of FIG. 5 provides for a situation when wireless communication is not available between the remote control system 34 and the central control system 32. After the remote control system 34 requests updating the remote user list 62 (step 86), the remote control system 34 determines whether wireless communication has been established between the wireless communicators 46 and 60 of the central and remote control systems 32 and 34, respectively (step 104). If wireless communication is not available (indicated by line 108), the remote control system 34 will compare the user data to the remote user list 62 (step 74) before the remote user list 62 is updated with the central user list 50. If wireless communication is available (indicated by line 110), the remote user list 62 is updated with the central user list 50 before comparing the user data with the remote user list 62. If wireless communication is available, the method of operating the access control system 20 will proceed as discussed above with regard to the method illustrated in FIG. 5.

The methods of operating the access control system 20 of FIGS. 4-6 are particularly suited for use with biometric user data. As would be understood by one of skill in the art, biometric user data typically includes a relatively large amount of data as compared to other types of user data, such as key or magnetic codes. As a result, more time is often needed to wirelessly transmit biometric user data than the other types of use data discussed above. As illustrated in the methods of FIGS. 4-6, the user data is not transmitted to the central control system 32. Rather, the user data remains with in the remote control system 34 where it is transmitted through internal wires. Therefore, the remote control system 34 can determine whether to grant or deny access to the user more quickly than if the remote control system 34 wirelessly transmitted the biometric user data to the central control system 32 to determine whether to unlock the lock assembly 64.

Figure 7:
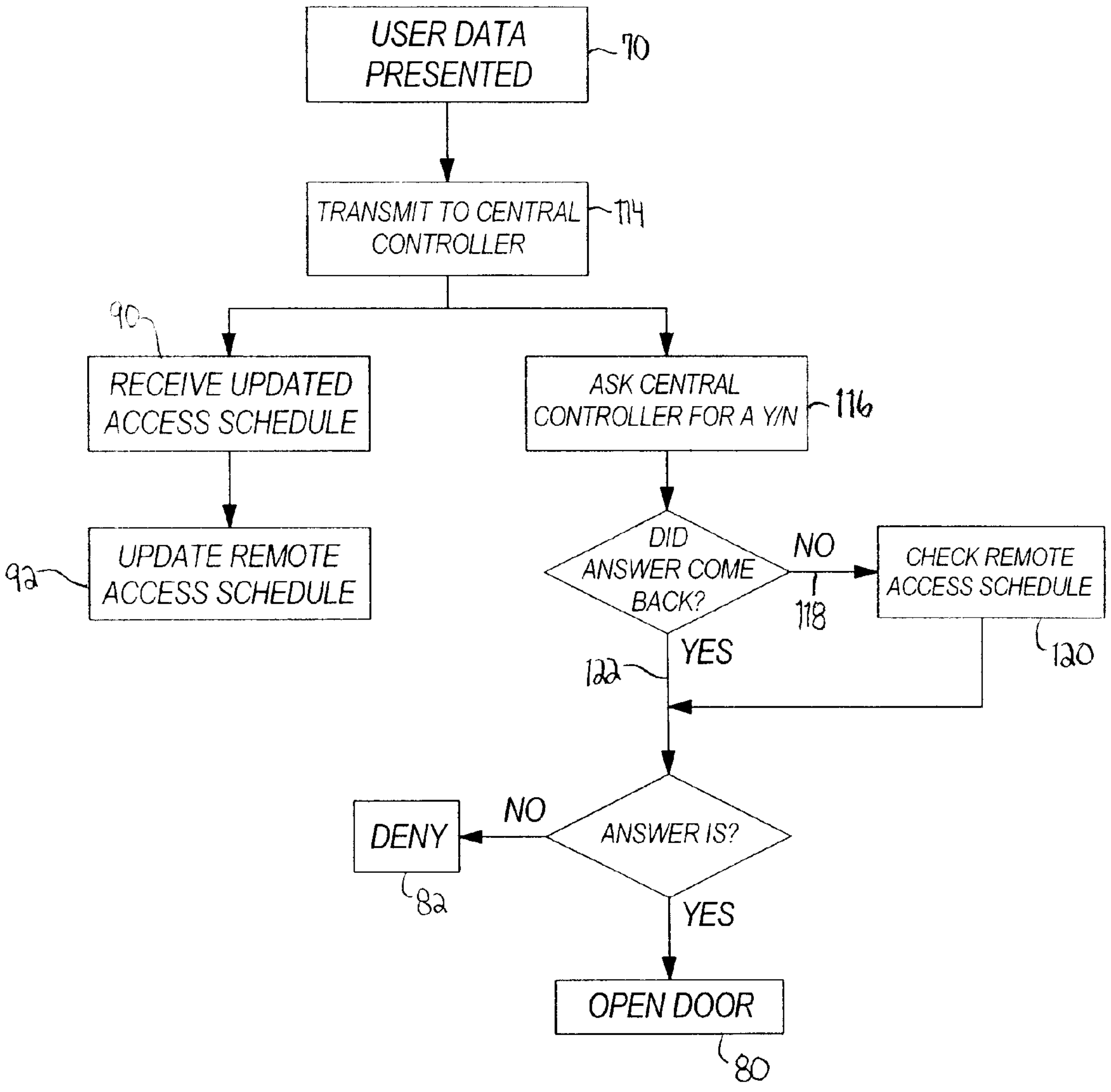

FIG. 7 illustrates yet anther method of operating the access control system 20. The method of operating the access control system 20 illustrated in FIG. 7 is somewhat similar to the methods of operating the access control system 20 illustrated in FIGS. 4-6. Therefore, only the general difference will be discussed in detail below and like steps have been given like reference numbers.

In the method illustrated in FIG. 7, after the user inputs the user data into the user identification reader 58 (step 70), the wireless communicator 60 of the remote control system 34 transmits the user data to the central control system 32 (step 114). The central control system 32 receives the user data and compares the user data with the central user list 50 to determine whether to unlock the lock assembly 64 (step 116). The wireless communicator 46 of the central control system 32 transmits the decision whether to unlock the lock assembly 64 back to the remote control system 34. If the remote control system 34 does not receive the decision (represented by line 118), such as when wireless communication is not available, the remote control system 34 will utilize the remote list 62 to determine whether unlock the lock assembly 64 (step 120). However, if wireless communication is available, the remote access controller 54 will utilize the decision from the central access controller 42 and central user list 50 to determine whether to unlock the lock assembly 64 (indicated by line 122).

Meanwhile, generally as the central access controller 42 is determining whether to grant or deny access through the door 28, the remote user list 62 is updated with the central user list 50 as discussed above (steps 90 and 92).

Figure 8:
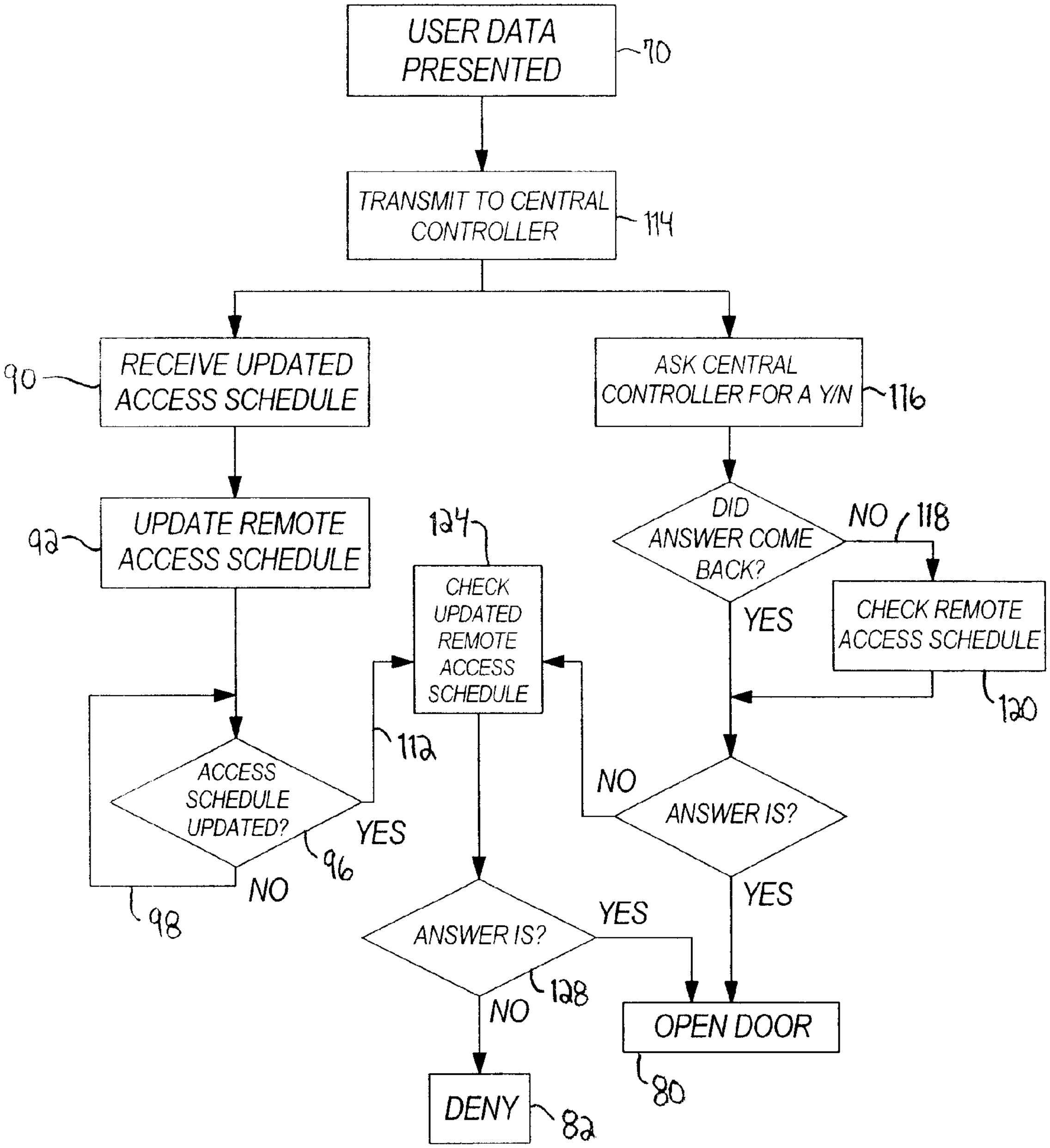

FIG. 8 illustrates yet another method of operating the access control system 20. The method illustrated in FIG. 8 is similar to the methods of operating the access control system 20 illustrated in FIGS. 4-7. Therefore, only the general differences will be discussed in detail, and like steps have been given like reference numbers.

In the method illustrated in FIG. 8, if the remote access controller 54 or the central access controller 42 (step 120 or step 116, respectively) determines that the user should be denied access to the door 28 (indicated by the line 123), the user data is compared to the remote user list 62 after the remote user list 62 has been updated with the central user list 50 (step 124). The remote access controller 54 determines whether the update of the remote user list 62 with the central user list 50 is complete (step 96). When the update is complete (indicated by line 112) the user data is compared with the updated remote user list 62 (step 124). Depending whether the user data matches user data on the updated remote user list 62, the user will either be granted (step 80) or denied (step 82) access through the door 28 (i.e., unlock the lock assembly 64).

The methods of operating the access control system 20 illustrated in FIGS. 4-8 each provide a method of updating the remote user list 62 with the central user list 50. In the methods illustrated in FIGS. 4-8, the user of the remote control system 34 initiates the request to update the remote user list 62. In other words, the user performs some action, such as inputting user data into the indemnification reader 58 that initiates updating the remote user list 62. Alternatively, another action by the user, such as attempting to open the door 28 may also initiate the request to update the remote user list 60. Such methods of operating the access control system 20 and updating the remote use list 60 allow the remote control system 34 to conserve power because the remote control system 34 does not have to be in constant or periodic communication with the central control system 32. Rater, communication is established between the remote and central control system 34 and 32 when the user attempts to gain access through the door 28. Therefore, the lifespan of the battery 66 is increased because the amount of time the remote control system 34 is in wireless communication with the central control system 32 is limited.

Various features and advantages of the invention are set forth in the following claims.

I claim:

1. A method of operating an access control system including a remote control system configured to control a lock and a central control system configured to wirelessly communicate with the remote control system, the method comprising:

inputting user data into a user identification reader of the remote control system;

actively determining whether wireless communication is available between the central control system and the remote control system;

comparing the user data with a remote user list when wireless communication is unavailable to determine whether to unlock the lock;

solely in response to the inputting user data step, updating the remote user list stored by the remote control system with a central user list stored by the central control system using a wireless communicator of the remote control system and a wireless communicator of the central control system when wireless communication is available; and comparing the user data with the remote user list after updating the remote user list to determine whether to unlock the lock;

wherein requesting updating the remote user list occurs after inputting user data and either a) before comparing the user data with the one of the remote user list and the central user list or b) when the user data is compared with the remote user list generally.

2. The method of claim 1, wherein the user data is compared with the remote user list, and wherein updating the remote user list is completed before comparing the user data with the remote user list when wireless communication is available.

3. The method of claim 2, further comprising determining whether the updating the remote user list step is complete.

4. The method of claim 1, wherein if wireless communication is available, determining whether updating the remote user list is complete.

5. The method of claim 1, wherein the user data is biometric user data.

6. The method of claim 1, further comprising supplying power to the wireless communicator of the remote control system from a battery in response to inputting the user data into the user identification reader.

7. The method of claim 1, further comprising restricting an amount of power supplied to the remote control system after comparing the user data with the one of the remote user list and the central user list.

8. The method of claim 1, wherein requesting updating the remote user list is initiated each time after inputting user data into the user identification reader of the remote control system.

9. The method of claim 1, further comprising transmitting the user data from the remote control system to the central control system, and wherein the user data is compared with the central user list to determine whether to unlock the lock.

10. The method of claim 1, further comprising transmitting the user data from the remote control system to the central control system, determining whether wireless communication is available between the remote control system and the central control system, if wireless communication is unavailable the user data is compared with the remote user list, if wireless communication is available the user data is compared with the central user list.

11. The method of claim 10, wherein if the user data is compared with the central user list to determine whether to unlock the lock and if the lock remains locked, then comparing the user data to the remote user list after updating the remote user list with the central user list.

12. The method of claim 6, further comprising restricting an amount of power supplied to the remote control system after comparing the user data with the remote user list.

13. An access control system comprising:

a central control system configured to store a central user list and operable to update the central user list, the central control system including a wireless communicator operable to transmit the central user list; and a remote control system configured to store a remote user list, the remote control system including, a remote access controller operable to actively determining whether wireless communication is available between the central control system and the remote control system, and compare the user data with a remote user list when wireless communication is unavailable to determine whether to unlock the lock;

a wireless communicator operable to receive the central user list from the central control system, and a user identification reader operable to receive user data from a user of the remote control system, and wherein the remote control system initiates a wireless communication with the central control system solely in response to receipt of the user data to update the remote user list with the central user list, wherein the remote user list is compared to the user data to make an access decision and wherein that access decision is made after the remote user list is updated when wireless communication is available and is made without updating the remote user list when wireless communication is not available;

wherein requesting updating the remote user list occurs after inputting user data and either a) before comparing the user data with the one of the remote user list and the central user list or b) when the user data is compared with the remote user list generally.

14. The access control system of claim 13, wherein the user initiates the wireless communication when the user inputs the user data into the user identification reader.

15. The access control system of claim 13, wherein the user data is biometric user data.

16. The access control system of claim 13, wherein the remote control system further includes a battery that supplies power to the wireless communicator of the remote control system in response to the user inputting the user data into the user identification reader.

* * * * *